(12) United States Patent
Endebrock

(10) Patent No.: US 11,193,556 B1
(45) Date of Patent: Dec. 7, 2021

(54) TRANSMISSION FOR TENSIONING DEVICE

(71) Applicant: Edward Norbert Endebrock, Lewiston, ID (US)

(72) Inventor: Edward Norbert Endebrock, Lewiston, ID (US)

( * ) Notice: Subject to any disclaimer, the term of this patent is extended or adjusted under 35 U.S.C. 154(b) by 0 days.

(21) Appl. No.: 17/381,018

(22) Filed: Jul. 20, 2021

Related U.S. Application Data

(60) Provisional application No. 63/054,697, filed on Jul. 21, 2020.

(51) Int. Cl.
*F16H 1/14* (2006.01)
*F16H 1/20* (2006.01)
*F16H 57/038* (2012.01)
*F16H 57/021* (2012.01)
*F16H 57/02* (2012.01)

(52) U.S. Cl.
CPC ............. *F16H 1/14* (2013.01); *F16H 57/021* (2013.01); *F16H 57/038* (2013.01); *F16H 2057/02039* (2013.01)

(58) Field of Classification Search
CPC ........ F16H 1/14; F16H 57/038; F16H 57/021; F16G 11/12
See application file for complete search history.

(56) References Cited

U.S. PATENT DOCUMENTS

| | | | | |
|---|---|---|---|---|
| 703,693 A * | 7/1902 | Bowser | ...................... | F16H 1/14 74/400 |
| 745,721 A * | 12/1903 | Fetzer | ...................... | F16H 1/14 74/417 |
| 2,715,843 A * | 8/1955 | Clarke | ..................... | F16G 11/12 74/417 |
| 3,442,444 A * | 5/1969 | Kievit | ....................... | F02C 7/36 415/164 |
| 4,860,614 A * | 8/1989 | Erdmann | ............... | F16H 57/021 475/246 |
| 5,730,541 A * | 3/1998 | Duett | ........................ | F16B 7/06 403/43 |
| 5,743,670 A * | 4/1998 | Ader | ..................... | E04B 1/6137 403/11 |
| 7,171,872 B1 * | 2/2007 | Keusch | ................... | B25B 17/00 74/417 |
| 9,610,883 B1 * | 4/2017 | Mahaffey | ................ | F16G 3/006 |
| 9,776,550 B2 * | 10/2017 | Mahaffey | .............. | B60P 7/0853 |
| 10,239,437 B2 * | 3/2019 | Thompson | ............ | B60P 7/0838 |
| 10,239,439 B2 * | 3/2019 | Cooper | .................... | G01L 5/101 |
| 10,814,773 B1 * | 10/2020 | Rainone | .................. | G01L 5/047 |

FOREIGN PATENT DOCUMENTS

GB          2146563 A  *  4/1985  ........... B25B 21/007

* cited by examiner

*Primary Examiner* — Jake Cook

(57) ABSTRACT

A power transmission for tensioners such as load binders and turnbuckles includes a driving gear and a driven gear mounted on or part of a driven shaft. The driving gear includes an axially protruding support boss which is received within a groove in the driven shaft. In a preferred embodiment the driving gear includes a lubricant reservoir and a lubricant passage communicating to the end face of the support boss in contact with the floor of the groove. The sidewalls of the groove constrain the support boss against longitudinal movement with respect to the axis of the driven shaft.

20 Claims, 3 Drawing Sheets

TRANSMISSION FOR TENSIONING DEVICE

CROSS REFERENCE TO RELATED APPLICATION

This non-provisional application claims the benefit of and priority to U.S. Provisional Patent Application 63/054,697 "Transmission for Tensioning Device" filed 21 Jul. 2020. The entire contents of. U.S. Provisional Patent Application 63/054,697 "Transmission for Tensioning Device" filed 21 Jul. 2020 are incorporated into this document by reference.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The invention relates to a transmission for a tensioning device in which large rotations at low torque may be exchanged through helical interfaces to produce high tensile forces in related shaft components.

BACKGROUND OF THE INVENTION

A tensioning device is used to tighten a chain, cable, strap or similar material. There are several types of tensioning devices including load binders, turnbuckles and also the top link used in a three-point tractor hitch.

Load binders are tools used to secure cargo or loads to trucks, rail cars, ships, vessels or other types of load carriers. A load binder is an apparatus for tensioning a chain, cable, strap or similar material to secure a large object such a crates, pipes or beams of construction materials, or large machinery to a carrier during transport or movement.

A common hazard in using load binders occurs when levers are used to gain mechanical advantage, and the reaction forces from the tension accumulate in the lever. Injuries occur when a lever escapes a user's hand and flails unexpectedly to strike the user, causing contusions, broken bones and worse.

INTRODUCTION AND SUMMARY OF THE INVENTION

The invention is a power transmission for tensioners such as load binders and turnbuckles, and includes a driving gear and a driven gear mounted on or part of a driven shaft. The driving gear includes an axially protruding support boss which is received within a groove in the driven shaft. In a preferred embodiment the driving gear includes a lubricant reservoir and a lubricant passage communicating to the end face of the support boss in contact with the floor of the groove. The sidewalls of the groove constrain the support boss against longitudinal movement with respect to the axis of the driven shaft.

A first objective of the invention is to provide a safer and easy method to convert torque applied to a load binder, turnbuckle, or a top link so that oppositely threaded apertures in the central shaft may draw oppositely threaded attachment attendances closer together for load binding tasks such as tightening cargo straps or chains used to secure a load to a vehicle, or to adjust the position of ponderous agricultural machinery attached to a three-point link of a typical tractor.

It is also important that the mechanical advantage provided within the tightening mechanism does not operate in reverse of its own accord; for example, if the pitch of a threaded member is selected such that the angle of its helix is steep enough, the tension developed to secure the load will overhaul the mechanism instead, that is, the threaded member will pull out while forcing the complementary, threadably coupled member to which it is mated to rotate. Multiple threads are particularly susceptible to this unwanted effect. It is therefore another objective of the invention to afford sufficient friction so that once its components are tightened under load, the tension developed is preserved until the user loosens the device.

Another objective of the invention is to accept torque and rotary inputs from a socket driving tool such as a wrench, a socket wrench, or an air wrench or the like. A corollary objective of the invention is to accept torque and rotary inputs directly from the shaft Another objective of the invention is to implement the same mechanism used to derive tension forces at great mechanical advantage so that it can also be used at other times to generate and maintain similarly large forces in compression.

Another objective of the invention, as opposed to the operation of over-center latching means, is that during use, the magnitude of operating force remains proportional to the securing load developed by the invention while a load is being secured or positioned by the invention. This proportional relationship of forces provides good physical feedback to users having less physical experience with the required forces of the job at hand. The rise and fall of force required to operate an over-center device can surprise inexperienced users or people of modest strength and become a source or root cause of accident or other unsafe condition. Thus another objective of the invention is improved safety and reduced opportunity for worksite accidents, especially pinching or crushing injuries in the immediate proximity of ponderous objects being positioned, adjusted or secured.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

DETAILED DESCRIPTION OF CERTAIN EMBODIMENTS

Figure 1:
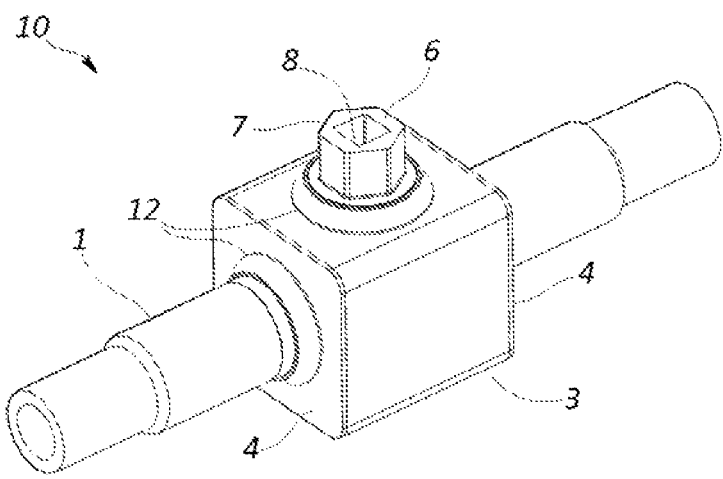
FIG. 1 shows an exterior isometric view of a tensioning device having transmission components in accordance with the invention contained within a housing.

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention. In the following description, for the purposes of explanation, numerous specific details are set forth in order to provide a thorough understanding of the described embodiments.

It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this specification reference numerals are enclosed by square brackets and punctuation marks such as commas or periods are placed inside the brackets and adjacent to the numeral character. (Similarly, punctuation marks for parenthetical phrases reside adjacent to the text characters and inside the parentheses.) This style differentiates between written English prose as opposed to lines of computer code or machine readable instructions.

FIG. 1 shows an exterior isometric view of a tensioning device [10] having transmission components in accordance with the invention contained within a housing. The housing may be made up as shewn using a section of structural tubing [3] capped at its ends by two end plates [4,] or may be made up as an assembly comprising cast parts or molded parts. In a preferred embodiment the case is assembled and closed permanently by welding and lubricants introduced into the enclosed volume of the gear box housing remain therein over the service life of the product. The gear box end plates each have an aperture which receives a bushing or thrust ring [12] through which the barrel passes. The housing encloses the first and second gears, which are the driving and the driven gears.

A central shaft also called a barrel [1] which is tubular shaped having a rotational axis along a length of the tube and a driving gear [6] which has a shaft with a first end having a polygonal exterior cross section [7] and a polygonal central aperture [8.] The driving gear is also held in position with respect to the barrel by means of its own thrust ring also located by an aperture in the housing.

In a preferred embodiment the central polygonal aperture is a square hole sized to accommodate the square drive strut of a socket wrench and the polygonal exterior is hexagonal and sized to accept a wrench or a socket driven by an air tool or a socket wrench, so the driving gear may be rotated by any number of tools an operator may have at hand. IN this specification 'polygonal' includes both regular and irregular polygons, and also includes closed contours having filleted or rounded apices between straight sides.

Figure 2:
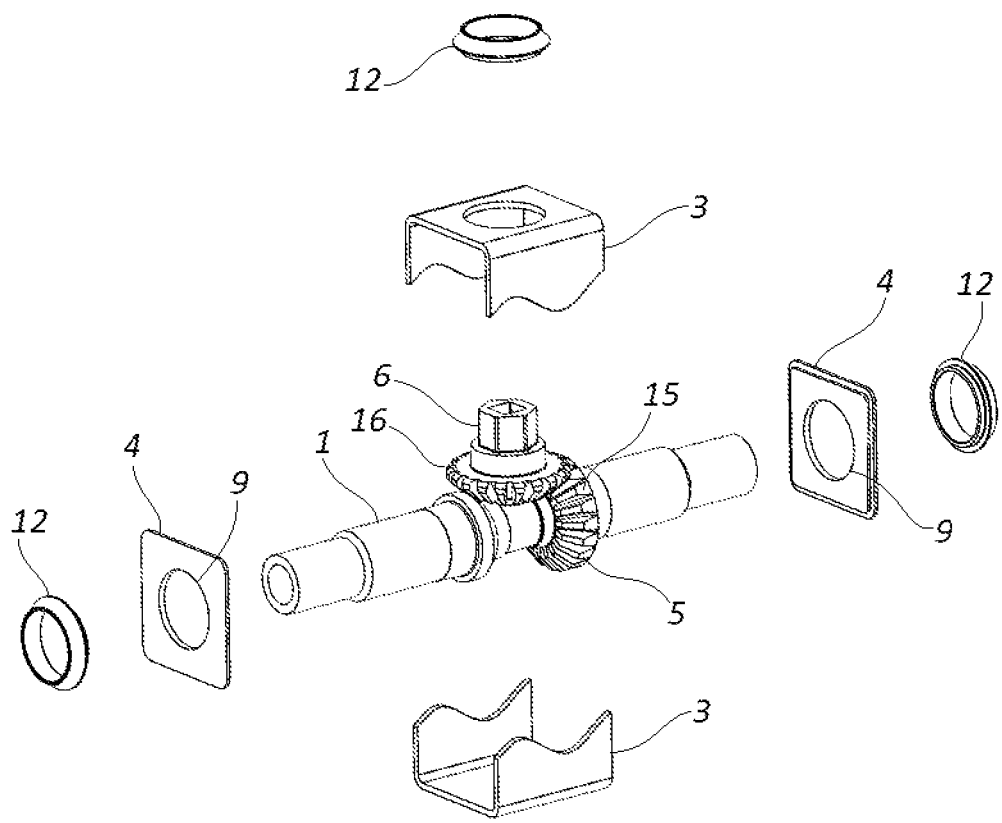
FIG. 2 shows an exploded view of the embodiment of FIG. 1, with the housing split apart to reveal internal components.

FIG. 2 shows an exploded view of the embodiment of FIG. 1, with the housing split apart to reveal internal components. The tubular portion of the gearbox housing is shown split apart. A transmission assembly for a tensioning device includes a first gear [6] with a first radial array of teeth [16] defining a first swept volume about a first axis of rotation. A second gear [5] on a driven shaft [1] includes a second radial array of teeth [15] defining a second swept volume about a second axis of rotation. The swept volumes of both gears intersect because the sets of gear teeth are mutually enmeshed. The housing in this embodiment is built up form a length of tubing [3] capped by two end plates. to enclose the first and second gears, The driving shaft of the assembly may be built up as a first shaft with the first gear being coaxially affixed to it, or the gear teeth may be an integral portion of the driving shaft. Similarly the second gear may be a gear component coaxially affixed to the driven shaft, or may be a toothed, integral portion of the driven shaft.

The driving shaft defines a first axis of rotation and passes through a first aperture in the enclosure or housing which in the embodiment shown is an aperture in the tubing. The two end plates [4] have apertures [9] which are the second and third apertures in the housing. One end of the driven shaft passes through the housing by a second aperture, and in the embodiment shown the other end of the driven shaft passes through the housing by a third aperture.

While transmitting torque, bevel gears and especially helical gears pick up thrust loads from the reaction forces of the teeth in contact due to the pressure angle of the tooth profile designed into the gears. These axial force components must be opposed in order to maintain the gears in contact with each other. Thus the housing also includes thrust rings [12] which have thrust surfaces complementary to shaft steps or gear faces in contact with them, and so for example, the thrust ring seated in the first aperture has a first thrust surface withstanding axial force component along the first axis of rotation of the first shaft while a second thrust ring has a thrust surface withstanding an axial force component along the second axis of rotation of the driven shaft. To lock the driven shaft in place within the housing, a third thrust ring has a third thrust surface withstanding a force component along the second axis of rotation but in a direction opposite to the thrust force withstood by the second thrust ring. The thrust rings are preferably made of tough, wear resistant materials such as 52100 alloy steel or other appropriately heat treated and conditioned steel alloys.

Figure 3A:
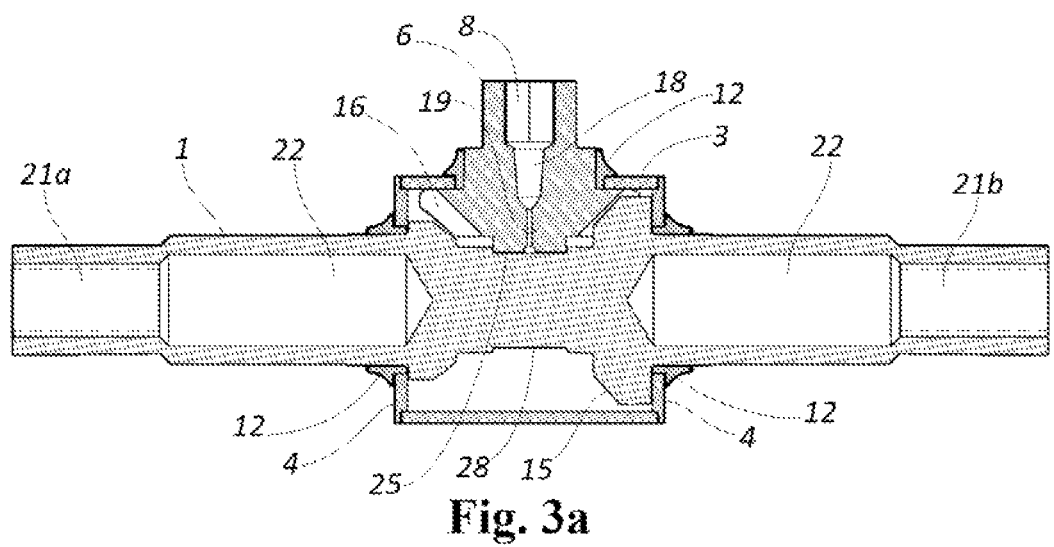
FIG. 3a shows a cross section view of the transmission assembly of FIG. 1.

FIG. 3a shows a cross section view of the transmission assembly of FIG. 1. As seen in FIG. 2, the enclosure as first, second, and third apertures. Additional apertures may be included for lubrication and inspection. A driving shaft [6] having a first axis of rotation, passes through the first aperture of the enclosure. The enclosure comprises a section of tubing [3] and end caps [4.] The driving shaft has a first end with a polygonal aperture [8] and second end [25] and a first radial array of gear teeth [16] defining a first swept volume, with the second end of the drive shaft protruding beyond the first swept volume.

A driven shaft [1] passes through the second and third apertures of the enclosure, and has a groove [28] and a second radial array of gear teeth [15] defining a second swept volume intersecting with the first swept volume of the first set of gear teeth. The second end of the driving shaft is received within the groove, trapping the driven shaft from translating axially and also withstanding axial forces from tightening tools applied to the first end of the first shaft. The driven shaft includes hollow sections [22] and also first and second threaded bores which are oppositely threaded, so for example if bore [21a] is cut with right hand-thread, then bore [21b] would be cut with left-hand thread. The handedness of the first threaded bore is threaded opposite to the handedness of the second threaded bore. The apertures in the housing are fitted with thrust rings [12] which include thrust faces which abut shaft steps to retain the shafts within the housing and to pick up and withstand thrust forces arising in the meshed gears and also withstand axial loads caused by tightening oppositely threaded objects fitted into the threaded bores of the shaft. Rotating the driving shaft will draw together or drive apart aby sets of oppositely threaded portions of end effectors such as hooks, chains or loading straps at substantial mechanical advantage.

The end effectors themselves are outside the scope of this invention but include threaded eyes and threaded hooks and the like and any of various means for connecting chain, cable, strap or similar material, or attachment points of ponderous objects to the driven shaft for operation in tension for securing attachment points on machinery such as lifting rings, or tow points on vehicle frames, and tie-down points on large, bulky objects being shipped by vessel, aircraft, or by vehicle. Still other end effectors are designed to withstand and transmit compression forces into beams or shafts.

The second end of the driving shaft further comprises an orifice communicating with a lubricant reservoir [18] and the polygonal aperture in the first end of the shaft. Lubricants deposited into the polygonal aperture will collect in the reservoir and then proceed along a lumen [19] and enter the interior of the housing where they may remain over the service life of the device. According to the embodiment shown, the lumen introduces lubricants at the contact interface of the second end face of the driving shaft and the floor of the groove of the driven shaft.

Also to be noted in this figure is that as shown the first gear has an odd number or teeth because the cross section hatching only appears on one side of the centerline of the gear, while the second gear has an even number of teeth because its hatching is symmetrical about the centerline of the driven shaft. Embodiments in which either or both or neither gears have even numbers of teeth all reside within the scope of the invention, including preferred embodiments in which at least one of the gears has a prime number of teeth. Including a such a gear in a gear train advantageously enforces that over time every tooth of the first gear will encounter every tooth on the second gear and vice versa, which advantageously distributes both lubrications and eventual mechanical wear as evenly as possible.

Figure 3B:
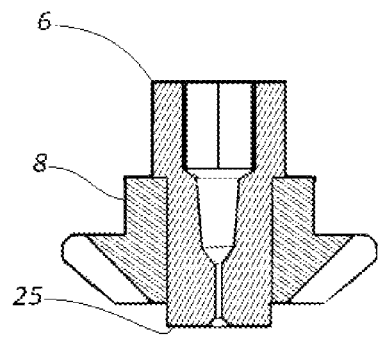
FIG. 3b shows a cross section of an alternative construction for a driving gear for an embodiment of a transmission assembly in accordance with the invention.

FIG. 3b shows a cross section of an alternative construction for a driving gear for an embodiment of a transmission assembly in accordance with the invention. The driving gear is the first of the two gears in the assembly and coaxially affixed to a driving shaft [6] having a first end and a second end [25] and a radial array of gear teeth defining a first swept volume. The second end of the drive shaft protrudes beyond the swept volume of the gear teeth. The second end of the driving shaft also includes an orifice communicating with a lubricant reservoir and a polygonal aperture in the first end of the shaft.

Figure 3C:
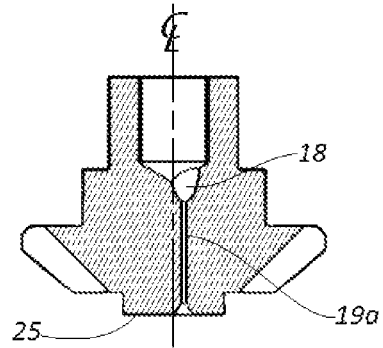
FIG. 3c shows a cross section of another embodiment of a driving gear for a transmission assembly in accordance with the invention.

FIG. 3c shows a cross section of another embodiment of a driving gear for a transmission assembly in accordance with the invention. In this embodiment the shaft and gear are a single mass rather than a separate shaft and an affixed gear as seen previously. In this embodiment the driving shaft has a first end and a second end [25] and a radial array of gear teeth defining a first swept volume. The second end of the drive shaft protrudes beyond the swept volume of the gear teeth. The second end of the driving shaft also includes an orifice communicating with a lubricant reservoir [18] and a polygonal aperture in the first end of the shaft. However, in this embodiment the lumen [19a] is radially offset from the centerline of the shaft, so that as it rotates it will shift longitudinally within the width of the groove and disperse lubricant over a wider swath within the groove.

Figure 4:
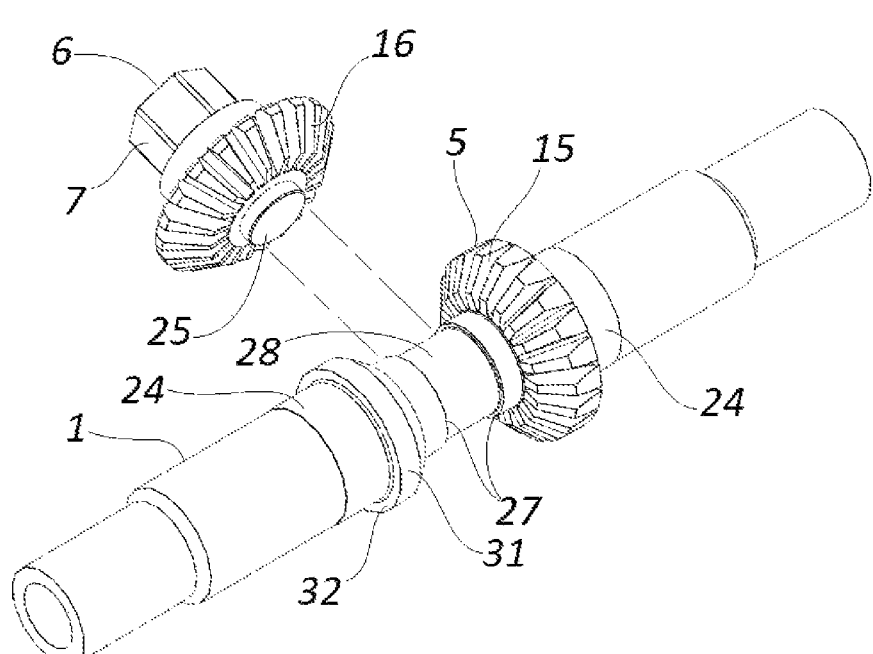
FIG. 4 shows an exploded isometric view of a driving gear, a driven gear, and a driven shaft of a transmission assembly in accordance with the invention.

FIG. 4 shows an exploded isometric view of a driving gear [6,] a driven gear [5,] and a driven shaft [1] of a transmission assembly in accordance with the invention. The driving gear is part of or is mounted to a driving shaft having an axis and first and second ends with the second end [25] axially protruding beyond the first swept volume of the teeth of the first gear. The exterior cross section of the first end [7] of the shaft includes a polygonal cross section which in this embodiment is a hexagonal cross section accepting of a wrench or a socket. The driven shaft defines a longitudinal axis and includes a groove [28] bounded by two sidewalls [27.] The driven shaft of this embodiment is a stepped shaft which includes precision surfaces [24] which are machined or ground to closer tolerances than other turned surfaces of the shaft.

The second end of the driving shaft is received within the groove of the driven shaft. Although the second end as seen as a cylindrical stub protruding beyond the gear teeth, the second end may optionally have a beveled stub such as a frustum of a cone which resides in a groove having tapered sidewalls complementary to the beveled surface. Thus the second end may be characterized as having a surface of revolution in contact with at least one of the two sidewalls. The driven shaft also includes a flange [32] having a thrust surface [32] which mates and runs against the thrust surface of the thrust rings [12 in FIGS. 2 and 3a.]

Also seen in this figure and in previous FIG. 3a are that in preferred embodiments the axes of rotation of the driving and driven shafts are coplanar and they intersect. The first axis of rotation of the first gear intersects the second axis of rotation of the second gear. It is also preferred that the axes are perpendicular to each other, so that the first axis of rotation of the first gear is perpendicular to the second axis of rotation of said second gear. However, other embodiments within the scope of the invention include arrangements wherein the driving gear is a small, helical-toothed pinion and the driven gear is a larger ring wheel, and the axes of the driving and driven shafts and gears neither intersect nor are necessarily coplanar. This sort of arrangement provides a favorable gear ratio to produce mechanical advantage between twisting the driving shaft and rotating the driven shaft. Combined with the pair of counter-threaded threaded bores of FIG. 3a, very large amplifications of applied force at a tool or wrench into axial tension or compression in the driven shaft for drawing together the end effectors of a load binder, an agricultural top link, or for controlling the length of extendable struts for positioning anchored machinery all become available.

Figure 5:
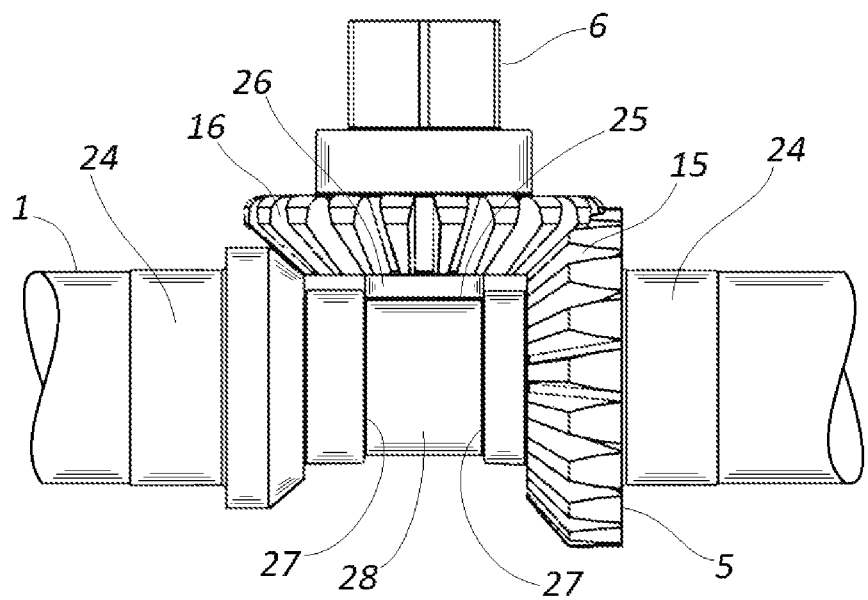
FIG. 5 shows a side view of a driving gear, a driven gear, and a driven shaft of a transmission assembly in accordance with the invention.

FIG. 5 shows a side view of a driving gear [6,] a driven gear [5,] and a driven shaft [1] of a transmission assembly in accordance with the invention. In this embodiment the axis of rotation of the first or driving gear is perpendicular to the axis of rotation of the second or driven gear. The driving gear has a first radial array of teeth [15] and the driven gear has a second array of teeth [16] intermeshed with the teeth of the first gear. The driven shaft of this embodiment is a stepped shaft which includes precision surfaces [24] which are machined or ground to closer tolerances than other turned surfaces of the shaft. The precision surfaces fit closely to similarly precisely machined internal surfaces of the thrust rings into which they insert. The driving gear is part of or is mounted to a driving shaft having an axis and first and second ends with the second end axially protruding beyond the first swept volume of the teeth of the first gear. The driven shaft defines a longitudinal axis and includes a groove [28] bounded by two sidewalls [27.] The driving shaft has a protruding end which includes a surface of revolution [26] received within the groove and if thrust forces arise in the driven shaft then this surface will run in contact with at least one of the sidewalls.

Figure 6:
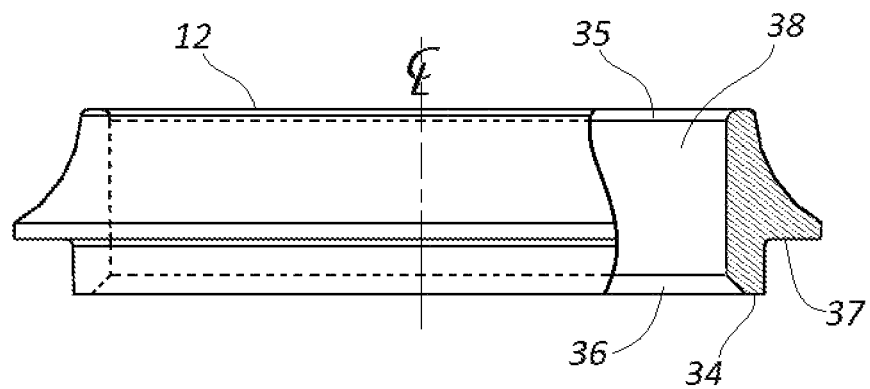
FIG. 6 shows a partial section view of a thrust ring of a transmission assembly in accordance with the invention.

FIG. 6 shows a partial section view of an embodiment of a thrust ring [12] of a transmission assembly in accordance with the invention. The ring includes a thrust [34] which is abutted by complementary thrust surfaces on the shafts which pass through them. The side face of a gear may also serve as a complementary thrust surface. The rims of the thrust ring preferably include lead-in features such as fillets [35] or chamfers [36.] The inner surface of the thrust ring may preferably also be precision machined or ground to precise tolerances and finishes so as to act as a journal bearing. The thrust ring also includes a flange surface [37] for welding or other permanent attachment to the housing. The inclusion of free running journal bearings, radial ball bearings, and thrust bearings seating between the shafts and the housing or being disposed between the thrust surfaces of the shaft and a thrust ring are also contemplated within the scope of the invention.

Air tools, electric or cordless drills may be affixed with drive bit which engage either or even both of these two features. Many other tools or means for rotating the driving shaft and driving gear are known or can be readily improvised by those skilled in the art, and it is not the intention of the inventor to limit the invention by use of the socket wrench receptacle. Also, rather than the square aperture as illustrated, a socket wrench receptacle having a hexagonal aperture is also contemplated within the invention, so that it can be driven by Allen wrenches at great mechanical advantage.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A transmission assembly for a tensioning device, comprising:
    a first gear further comprising
        a first axis of rotation and a first radial array of teeth defining a first swept volume,
    a second gear further comprising
        a second axis of rotation, and a second radial array of teeth defining a second swept volume intersecting said first swept volume,
    a driving shaft having an axis and first and second ends with said second end axially protruding beyond said first swept volume of said first gear,
    a driven shaft having a longitudinal axis and comprising a groove,
    with
        said first gear coaxially affixed to said driving shaft,
        said second gear coaxially affixed to said driven shaft, and
        said second end of said driving shaft received within said groove.

2. The transmission assembly of claim 1, wherein said first axis of rotation of said first gear intersects said second axis of rotation of said second gear.

3. The transmission assembly of claim 1, wherein said first axis of rotation of said first gear is perpendicular to said second axis of rotation of said second gear.

4. The transmission assembly of claim 1, further comprising a housing enclosing said first and second gears, with said housing further comprising a first thrust surface withstanding a force component along said first axis of rotation, and
    a second thrust surface withstanding a force component along said second axis of rotation.

5. The transmission assembly of claim 4, wherein said housing further comprises a third thrust surface withstanding a force component along said second axis of rotation.

6. The transmission assembly of claim 1, wherein at least one radial array of teeth comprises a prime number of teeth.

7. The transmission assembly of claim 1, wherein said driven shaft further comprises first and second threaded bores with a handedness of said first bore threaded opposite to a handedness of said second bore.

8. The transmission assembly of claim 1, wherein said groove in said driven shaft further comprises two sidewalls, and said second end of said first shaft further comprises a surface of revolution in contact with at least one of said two sidewalls.

9. The transmission assembly of claim 1, wherein said first end of said driving shaft further comprises a polygonal exterior cross section.

10. The transmission assembly of claim 9, wherein said first end of said driving shaft further comprises a polygonal aperture.

11. The transmission assembly of claim 10, wherein said second end of said driving shaft further comprises an orifice communicating with said polygonal aperture.

12. A transmission assembly for a tensioning device, comprising:
    an enclosure having at least first, second, and third apertures,
    a driving shaft passing through said first aperture of said enclosure and defining a first axis of rotation,
    said driving shaft further comprising first and second ends and a first radial array of gear teeth defining a first swept volume, with said second end of said drive shaft protruding beyond said swept volume, a driven shaft passing through said second and third apertures of said enclosure, said driven shaft further comprising a groove and a second radial array of gear teeth defining a second swept volume intersecting with said first swept volume, with said second end of said driving shaft received within said groove.

13. The transmission assembly of claim 12, with said housing further comprising a first thrust surface withstanding a force component along said first axis of rotation, and a second thrust surface withstanding a force component along said second axis of rotation.

14. The transmission assembly of claim 12, wherein said housing further comprises a third thrust surface withstanding a force component along said second axis of rotation.

15. The transmission assembly of claim 12, wherein at least one radial array of teeth comprises a prime number of teeth.

16. The transmission assembly of claim 12, wherein said driven shaft further comprises first and second threaded bores with a handedness of said first bore threaded opposite to a handedness of said second bore.

17. The transmission assembly of claim 12, wherein said first end of said driving shaft further comprises a polygonal exterior cross section.

18. The transmission assembly of claim 12, wherein said first end of said driving shaft further comprises a polygonal aperture.

19. The transmission assembly of claim 18, wherein said second end of said driving shaft further comprises an orifice communicating with said polygonal aperture.

20. The transmission assembly of claim 12, wherein said groove in said driven shaft further comprises two sidewalls, and said second end of said driving shaft further comprises a surface of revolution in contact with at least one of said two sidewalls.

* * * * *